United States Patent [19]

Ovnick, Jr.

[11] 4,191,966
[45] Mar. 4, 1980

[54] CATV BLOCK CONVERTER

[75] Inventor: John L. Ovnick, Jr., Los Angeles, Calif.

[73] Assignee: RCA Corporation, New York, N.Y.

[21] Appl. No.: 948,014

[22] Filed: Oct. 2, 1978

[51] Int. Cl.² .............................................. H04N 7/16
[52] U.S. Cl. ..................................... 358/86; 325/308; 325/460; 325/461
[58] Field of Search ............... 325/308, 460, 461, 435, 325/458, 459, 309; 358/86

[56] References Cited

U.S. PATENT DOCUMENTS

| | | | |
|---|---|---|---|
| 3,730,980 | 5/1973 | Kirk, Jr. | 325/461 |
| 3,882,266 | 5/1975 | Walding | 325/308 |
| 4,079,415 | 3/1978 | Will | 358/86 |

Primary Examiner—John C. Martin
Assistant Examiner—Jin F. Ng
Attorney, Agent, or Firm—Eugene M. Whitacre; Paul J. Rasmussen; Robert L. Troike

[57] ABSTRACT

A converter that is capable of handling all 35 CATV channels without a separate tuning means. The standard VHF channels 2 through 13 on the cable are passed through to the TV set's VHF tuner and the remaining channels are block upconverted to the UHF frequencies to be received on a standard television UHF tuner.

5 Claims, 3 Drawing Figures

CATV BLOCK CONVERTER

BACKGROUND OF THE INVENTION

This invention relates generally to cable television and, more particularly, to a method and apparatus enabling a TV set to receive all 35 of the CATV signals in the 54 to 300 MHz without switches or controls on the converter. In cable television systems, signals transmitted are in a first band from 54–86 MHz and a second or midband from 120–174 MHz, a third or a high VHF band from 174–216 and a fourth or super band from 216–300 MHz. In the prior art, the converters required switches or controls to convert these signals, particularly signals in the 120 MHz–174 MHz (Midband) and 216 MHz–300 MHz (Superband) range to signals usable in the VHF frequency band such as to a predetermined channel from 2 through 13. This necessitates a number of controls when switching from one channel to the next and is also not compatible with TV set remote controls. For example, see patent 3,333,198 of Mandell et al. In this reference patent, a variable oscillator 32 provides a required heterodyne for converting the modulated carriers to a suitable intermediate frequency. The local fixed oscillator 38 then converts this intermediate frequency to one of the VHF television channels. The user therefore would be required to adjust that variable oscillator to a value which would when heterodyned with the incoming signal in the 120 to 174 MHz or A through W range select one of those channels on a VHF channel. This would require retuning of the local oscillator when tuning to another cable frequency. This selection may also be done by switches selecting a switchable oscillator such as that described in U.S. Pat. No. 3,643,164 of Sly et al. Further, there may be an elaborate switching network as in Zimmerman et al, U.S. Pat. No. 3,581,209. These prior art arrangements are not compatible with the TV remote controls. In addition, in the UHF tuner there is an image at interference frequencies 15 channels above a particular channel frequency.

SUMMARY OF THE INVENTION

Briefly, the above problems are overcome by a block converter which converts the signals in the midband cable channels A through I and the superband cable channels J through W to frequencies in the UHF tuner range.

DESCRIPTION OF THE INVENTION

Figure 1:
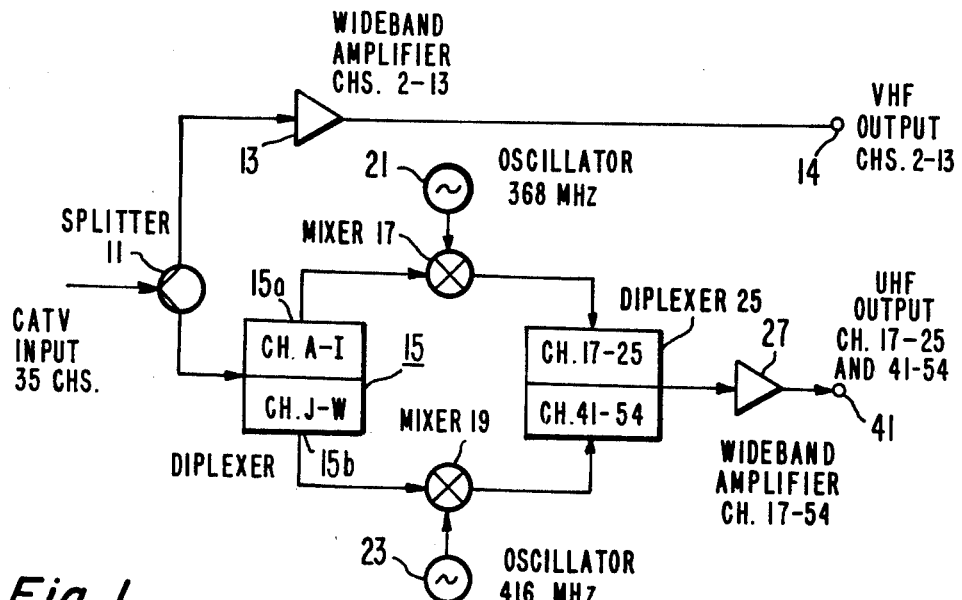
FIG. 1 is a block diagram of the converter according to the present invention.

Referring to FIG. 1 thirty-five (35) CATV channels from a cable are applied to a splitter 11. The splitter 11 equally power divides the incoming signals (3 db coupler). The low VHF channels from 54 MHz–86 MHz and the high VHF signals of 174 MHz to 216 MHz are applied to an amplifier 13. The low and high VHF signals are amplified in wideband amplifier 13 and are applied to terminal 14 which is adapted to be coupled to the VHF terminals of a standard television tuner of a television receiver. The wideband amplifier 13 in the VHF path is to make up for the splitter loss. The signals at the cable channels A through I are from frequencies 120 MHz to 174 MHz. The signals at the cable channels J through W are from 216 MHz–300 MHz. The power divided signals from splitter 11 are applied to the diplexer 15. The midband signals of 120 MHz–174 MHz (channels A through I) are coupled from the diplexer 15 via midband filter 15a to a mixer 17. The superband signals of frequencies 216 MHz–300 MHz (channels J through W) pass through the diplexer 15 via superband filter 15b and are applied to the mixer 19. A fixed local oscillator 21 provides a signal of 368 MHz to be heterodyned at mixer 17 with the midband signals of channels A through I to produce thereby the unconverted signals from 488 MHz–542 MHz. This matches with the standard TV UHF receiver tuner channels 17 through 25. The 216 MHz to 300 MHz signals (J through W) are mixed at mixer 19 with a 416 MHz signal from fixed local oscillator 23 to produce the frequencies of 632 MHz–716 MHz. This covers the frequencies from channel 41 through channel 54 in the standard UHF television receiver. These signals are combined via diplexer 25 and amplified by wideband amplifier 27. These UHF signals are applied to terminal 41 which is adapted to be coupled to a standard UHF TV tuner. In the manner described, all of the VHF channels are passed on and then received by a standard TV VHF tuner. All of the cable channels A through I are upconverted the same amount to UHF signals that can be separately received on a standard TV set UHF tuner by selecting channels 17 through 25. The cable channels J through W are upconverted the same amount so that they can be separately received by selecting channels 41 through 54. It is noted that the local oscillators 21 and 23 are fixed and there are no adjustments needed to be made to the converter. It is further to be noted that this arrangement accommodates a remote control system since the operator only has to select the UHF channel that corresponds to the cable channel.

In UHF tuners, there is an image reflection problem wherein there is an interference in a channel from another channel fifteen (15) channels (90 MHz) above. A guard band is provided from channels 26 through 40 to allow separation of the converted midband and superband signals to eliminate the image problems inherent in UHF tuners. By arranging the guard band and the converting frequencies such that the lowest frequency in the superband is over 90 MHz above the highest frequency in the midband, the image problem is avoided.

Figure 2:
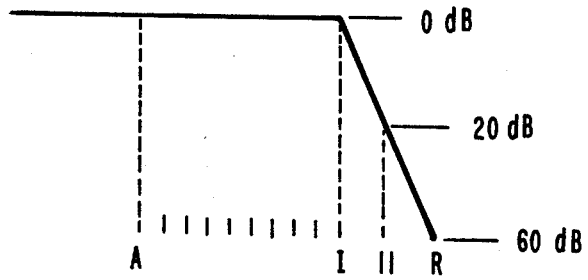
FIG. 2 is a plot of diplexer response for channels A through R.
Figure 3:
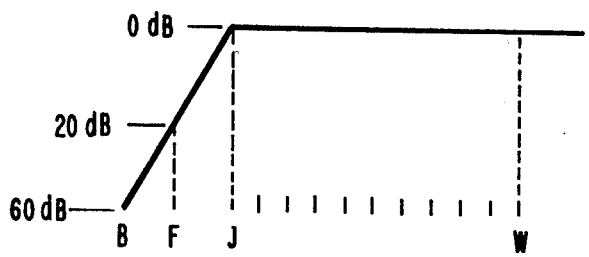
FIG. 3 is a plot of diplexer response for channels B through W.

Although UHF tuners have other IF beat problems, it has been found that in cable television systems these IF beat problems are minimal due to equal amplitude signal levels and that the main problem is the image problem for which this converter provides a solution while also converting all of the signals to separate channels in a standard television receiver without the separate switching of the converter. The responses required for the filtering in the diplexer 15 ahead of the mixers 17 and 19 allow adequate rejection of the unwanted conversions is illustrated in FIG. 2. The filtering characteristics of diplexer 15 for channels A through I in the midband filter 15a would convert channels A through I with no attenuation and reject the input channel 11 by at least 20 db for image reasons and all input channels about R by 60 db for co-channel interference reasons. The other filter 15b of diplexer 15 must reject all channels below B by at least 60 db for co-channel interference reasons and all channels below F by 20 db for image reasons. The wide band amplifier 27 in the UHF path is employed to make up for the splitter and mixer losses and to provide for an overall gain of at least 3 db.

What is claimed is:

1. A cable TV converter for converting the cable TV midband channel frequencies of 120 to 174 MHz and the superband channel frequencies of 216 to 300 MHz to conventional TV tuner frequencies comprising:

filtering means responsive to said midband and superband cable channel frequencies for separating said midband and superband channel frequencies, first upconverting means coupled to said filtering means and responsive to said midband signals for upconverting all of said midband channel frequencies by a same fixed frequency to a first block of UHF TV tuner channel frequencies, second upconverting means coupled to said filtering means responsive to said superband channel frequencies for upconverting all of said superband channel frequencies by a same fixed frequency to a second block of different UHF TV tuner channel frequencies, and means coupled to said first and second upconverting means for combining said UHF channel frequencies.

2. The combination of claim 1 wherein said second upconverting means upconverts said superband signals so that the lowest frequency of said second block UHF frequencies is at least 90 MHz above the highest frequency of said first block of UHF tuner channel frequencies.

3. The combination of claim 2 wherein each of said first and second upconverting means includes a fixed frequency local oscillator.

4. The combination of claim 3 wherein a first of said oscillators operates at 368 MHz and the second oscillator operates at 416 MHz.

5. A cable TV converter for providing all of the cable TV frequencies including the midband cable channels A through I and the superband cable channels J through W to standard TV receiver channels having VHF and UHF tuners comprising:

means responsive to incoming signals at all channels for equally power dividing said signals to provide first and second power divided output signals, means including an amplifier for coupling said first power divided signals to a first output terminal adapted to be coupled to a TV VHF tuner, diplexer means responsive to said second power divided signals for separating said midband channel frequencies and said superband channel frequencies, first upconverting means coupled to said diplexer means and responsive to said midband channel frequencies for upconverting all of said midband channel frequencies by a same fixed frequency to lower channel UHF TV frequencies, second upconverting means coupled to said diplexer and responsive to said superband channel frequencies for upconverting all of said superband channel frequencies by a same fixed frequency to upper UHF TV channel frequencies, and means coupled to said first and second upconverting means for combining said UHF channel frequencies to a common terminal adapted to be coupled to a UHF TV tuner.

* * * * *

UNITED STATES PATENT AND TRADEMARK OFFICE
CERTIFICATE OF CORRECTION

PATENT NO. : 4,191,966

DATED : March 4, 1980

INVENTOR(S) : John L. Ovnick, Jr.

It is certified that error appears in the above-identified patent and that said Letters Patent is hereby corrected as shown below:

Column 2, line 14, that portion reading "unconverted" should read -- upconverted --; line 66, that portion reading "about" should read -- above --; Column 4, line 8, that portion reading "TV frequencies" should read -- TV channel frequencies --.

Signed and Sealed this

Twentieth Day of May 1980

[SEAL]

Attest:

SIDNEY A. DIAMOND

Attesting Officer

Commissioner of Patents and Trademarks